US008036922B2

(12) United States Patent
Yamamoto et al.

(10) Patent No.: US 8,036,922 B2
(45) Date of Patent: Oct. 11, 2011

(54) APPARATUS AND COMPUTER-READABLE PROGRAM FOR ESTIMATING MAN-HOURS FOR SOFTWARE TESTS

(75) Inventors: Hiroshi Yamamoto, Kyoto (JP); Kiyotaka Kasubuchi, Kyoto (JP); Itaru Furukawa, Kyoto (JP); Taku Mizuno, Kyoto (JP)

(73) Assignee: Dainippon Screen MFG Co., Ltd., Kyoto (JP)

( * ) Notice: Subject to any disclaimer, the term of this patent is extended or adjusted under 35 U.S.C. 154(b) by 1167 days.

(21) Appl. No.: 11/806,304

(22) Filed: May 31, 2007

(65) Prior Publication Data

US 2007/0299717 A1 Dec. 27, 2007

(30) Foreign Application Priority Data

Jun. 22, 2006 (JP) ................................ 2006-172640

(51) Int. Cl.
*G06Q 10/00* (2006.01)
*G06F 11/00* (2006.01)
*G06F 9/44* (2006.01)
(52) U.S. Cl. ....... 705/7.11; 705/7.14; 714/46; 714/47.1; 714/47.2; 717/124
(58) Field of Classification Search ......... 705/7.11–7.42
See application file for complete search history.

(56) References Cited

U.S. PATENT DOCUMENTS

| | | | | | |
|---|---|---|---|---|---|
| 5,548,718 | A | * | 8/1996 | Siegel et al. ................. | 714/38.1 |
| 6,473,794 | B1 | * | 10/2002 | Guheen et al. ............... | 709/223 |
| 6,799,145 | B2 | * | 9/2004 | Kennedy et al. ............. | 702/182 |
| 7,493,077 | B2 | * | 2/2009 | Coleman et al. ............. | 434/350 |
| 2003/0125903 | A1 | * | 7/2003 | Dobson ........................ | 702/181 |
| 2005/0033632 | A1 | * | 2/2005 | Wu et al. ...................... | 705/10 |
| 2005/0171831 | A1 | * | 8/2005 | Johnson et al. ............... | 705/10 |
| 2006/0107152 | A1 | * | 5/2006 | Stobie et al. ................. | 714/736 |
| 2007/0226546 | A1 | * | 9/2007 | Asthana et al. ............... | 714/47 |

(Continued)

FOREIGN PATENT DOCUMENTS

JP 2002-342118 11/2002

OTHER PUBLICATIONS

Malaiya et al. "What Do the Software Reliability Growth Model Parameters Represent?" (1997) Proc. IEEE Int. Symp. Software Reliability Engineering.*

(Continued)

*Primary Examiner* — Romain Jeanty
*Assistant Examiner* — Sujay Koneru
(74) *Attorney, Agent, or Firm* — McDermott Will & Emery LLP (57) ABSTRACT

An additional storage processing part additionally stores, in a test information table, data relating to a test to be performed, each time any one of a plurality of tests is performed. An updating part updates the corresponding record in a skill level table each time the test is performed, and then an additional storage by the additional storage processing part is executed. A man-hour computing part executes the process of estimating a test man-hour relating to an evaluator and a test designated in accordance with the contents of a display in a display part. Thus, a test man-hour estimating apparatus can accurately estimate the man-hour of the test the evaluator performs repeatedly, based to the data stored in the test information table and the skill level table.

5 Claims, 6 Drawing Sheets

| ID | TEST SPECIFICATION IDENTIFICATION DATA | EVALUATION PERIOD | CASE NUMBER | FIRST PERSONAL NAME DATA | FIRST REPEATING NUMBER | INDIVIDUAL PERFORMANCE FACTOR | NORMALIZED PERFORMANCE FACTOR |
|---|---|---|---|---|---|---|---|
| 1001 | STC0001 | 4.0 | 40 | YAMADA TARO | 1 | 0.100 | 1.00 |
| 1002 | STC0001 | 3.5 | 38 | YAMADA TARO | 2 | 0.092 | 0.92 |
| 1003 | STC0001 | 3.0 | 39 | YAMADA TARO | 3 | 0.077 | 0.77 |
| 1004 | STC0001 | 2.9 | 40 | YAMADA TARO | 4 | 0.073 | 0.73 |
| 1005 | STC0002 | 3.5 | 50 | SUZUKI ICHIRO | 1 | 0.070 | 1.00 |
| 1006 | STC0002 | 3.3 | 48 | SUZUKI ICHIRO | 2 | 0.069 | 0.98 |
| 1007 | STC0002 | 3.3 | 48 | SUZUKI ICHIRO | 3 | 0.069 | 0.98 |
| 1008 | STC0002 | 3.2 | 44 | SUZUKI ICHIRO | 4 | 0.073 | 1.04 |
| 1009 | STC0003 | 2.5 | 40 | KUDO JUNICHI | 1 | 0.063 | 1.00 |
| 1010 | STC0003 | 2.0 | 44 | KUDO JUNICHI | 2 | 0.045 | 0.73 |
| 1011 | STC0003 | 1.8 | 45 | KUDO JUNICHI | 3 | 0.040 | 0.64 |
| 1012 | STC0003 | 1.7 | 47 | KUDO JUNICHI | 4 | 0.036 | 0.58 |
| 1013 | STC0004 | 2.5 | 40 | YAMADA TARO | 1 | 0.063 | 1.00 |
| 1014 | STC0004 | 2.0 | 44 | YAMADA TARO | 2 | 0.045 | 0.73 |
| 1015 | STC0004 | 1.8 | 45 | YAMADA TARO | 3 | 0.040 | 0.64 |
| 1016 | STC0004 | 1.7 | 47 | YAMADA TARO | 4 | 0.036 | 0.58 |
| ⋮ | ⋮ | ⋮ | ⋮ | ⋮ | ⋮ | ⋮ | ⋮ |

U.S. PATENT DOCUMENTS

2008/0092120 A1* 4/2008 Udupa et al. .................. 717/124

OTHER PUBLICATIONS

M. Hutchins, T. Goradia, and T. Ostrand, "Experiments on the effectiveness of data-flow and control-flow based test data adequacy criteria", Int. Conf. Software Engineering, pp. 191-200, 1994.*

Huang "Performance of analysis of software reliability growth models with testing-effort and change-point" (May 2005) Journal of Systems and Software, vol. 76, Issue 2, pp. 181-194.*

Burnstein "Testing Goals, Policies, Plans and Documentation" (2003) Practical Software Testing. Springer Professional Computing, 189-233.*

* cited by examiner

| ID | TEST SPECIFICATION IDENTIFICATION DATA | EVALUATION PERIOD | CASE NUMBER | FIRST PERSONAL NAME DATA | FIRST REPEATING NUMBER | INDIVIDUAL PERFORMANCE FACTOR | NORMALIZED PERFORMANCE FACTOR |
|---|---|---|---|---|---|---|---|
| 1001 | STC0001 | 4.0 | 40 | YAMADA TARO | 1 | 0.100 | 1.00 |
| 1002 | STC0001 | 3.5 | 38 | YAMADA TARO | 2 | 0.092 | 0.92 |
| 1003 | STC0001 | 3.0 | 39 | YAMADA TARO | 3 | 0.077 | 0.77 |
| 1004 | STC0001 | 2.9 | 40 | YAMADA TARO | 4 | 0.073 | 0.73 |
| 1005 | STC0002 | 3.5 | 50 | SUZUKI ICHIRO | 1 | 0.070 | 1.00 |
| 1006 | STC0002 | 3.3 | 48 | SUZUKI ICHIRO | 2 | 0.069 | 0.98 |
| 1007 | STC0002 | 3.3 | 48 | SUZUKI ICHIRO | 3 | 0.069 | 0.98 |
| 1008 | STC0002 | 3.2 | 44 | SUZUKI ICHIRO | 4 | 0.073 | 1.04 |
| 1009 | STC0003 | 2.5 | 40 | KUDO JUNICHI | 1 | 0.063 | 1.00 |
| 1010 | STC0003 | 2.0 | 44 | KUDO JUNICHI | 2 | 0.045 | 0.73 |
| 1011 | STC0003 | 1.8 | 45 | KUDO JUNICHI | 3 | 0.040 | 0.64 |
| 1012 | STC0003 | 1.7 | 47 | KUDO JUNICHI | 4 | 0.036 | 0.58 |
| 1013 | STC0004 | 2.5 | 40 | YAMADA TARO | 1 | 0.063 | 1.00 |
| 1014 | STC0004 | 2.0 | 44 | YAMADA TARO | 2 | 0.045 | 0.73 |
| 1015 | STC0004 | 1.8 | 45 | YAMADA TARO | 3 | 0.040 | 0.64 |
| 1016 | STC0004 | 1.7 | 47 | YAMADA TARO | 4 | 0.036 | 0.58 |
| ... | ... | ... | ... | ... | ... | ... | ... |

FIG. 3

| ID | SECOND PERSONAL NAME DATA | SECOND REPEATING NUMBER | SKILL LEVEL DATA | CUMULATIVE NUMBER |
|---|---|---|---|---|
| 5001 | YAMADA TARO | 1 | 1.00 | 5 |
| 5002 | YAMADA TARO | 2 | 0.89 | 4 |
| 5003 | YAMADA TARO | 3 | 0.85 | 4 |
| 5004 | YAMADA TARO | 4 | 0.80 | 4 |
| 5005 | YAMADA TARO | 5 | 0.79 | 3 |
| 5006 | YAMADA TARO | 6 | 0.77 | 3 |
| 5007 | SUZUKI ICHIRO | 1 | 1.00 | 5 |
| 5008 | SUZUKI ICHIRO | 2 | 0.87 | 5 |
| 5009 | SUZUKI ICHIRO | 3 | 0.86 | 5 |
| 5010 | SUZUKI ICHIRO | 4 | 0.85 | 5 |
| 5011 | SUZUKI ICHIRO | 5 | 0.85 | 5 |
| 5012 | SUZUKI ICHIRO | 6 | 0.84 | 4 |
| 5013 | KUDO JUNICHI | 1 | 1.00 | 6 |
| 5014 | KUDO JUNICHI | 2 | 0.86 | 6 |
| 5015 | KUDO JUNICHI | 3 | 0.85 | 5 |
| 5016 | KUDO JUNICHI | 4 | 0.83 | 5 |
| 5017 | KUDO JUNICHI | 5 | 0.80 | 5 |
| 5018 | KUDO JUNICHI | 6 | 0.78 | 4 |
| ⋮ | ⋮ | ⋮ | ⋮ | ⋮ |

| TESTER ASSIGNMENT | | | | | |
|---|---|---|---|---|---|
| 51 51a | TEST SPECIFICATION NAME 52 | CASE NUMBER 53 | LAST TESTER 54 | TESTERS 55 55a | EVALUATED MAN-HOUR 57 |
| ▶ STC0001: | GUI TEST OF FUNCITON A | 50 | YAMADA TARO | YAMADA TARO ▶ | 3.5 |
| ▶ STC0002: | COMPUTING TEST OF FUNCTION B | 30 | SUZUKI ICHIRO | SUZUKI ICHIRO ▶ | 2.0 |
| ▶ STC0003: | GUI TEST OF FUNCTION C | 40 | KUDO JUNICHI | KUDO JUNICHI ▶ | 3.6 |

20
50

FIG. 6

APPARATUS AND COMPUTER-READABLE PROGRAM FOR ESTIMATING MAN-HOURS FOR SOFTWARE TESTS

BACKGROUND OF THE INVENTION

1. Field of the Invention

The present invention relates to a test man-hour estimating apparatus of estimating the man-hour of the same type of a test that an evaluator performs repeatedly to an object to be tested, and to a recording medium recording a computer-readable program. In particular, the invention relates to an improvement in the technique of estimating the man-hour.

2. Description of the Background Art

Conventionally, there has been known the technique of evaluating a test process for testing software based on a reliability growth model It is known from experience that, when the same type of a test is performed repeatedly, the test man-hour (test period) can be reduced to a certain level. It is also known that the level of reduction differs for different evaluators (test engineers).

However, the conventional test process fails to reflect the levels of reduction of the individual evaluators, making it impossible to estimate accurately the test man-hour of software.

SUMMARY OF THE INVENTION

The present invention is directed to a test man-hour estimating apparatus of estimating the man-hour of the same type of a test that an evaluator performs repeatedly to an object to be tested.

According to the present invention, the test man-hour estimating apparatus includes: (a) a storage part capable of storing a plurality of tables of a test information table and a skill level table, the test information table capable of storing by correlating the followings: (1-1) test specification identification data specifying a first test from a plurality of tests; (1-2) first personal name data indicating a first evaluator who performed the first test; (1-3) a first repeating number indicating a number of times the first test was performed by the first evaluator; and (1-4) an individual performance factor indicating a performance efficiency of the first evaluator, with respect to the first test the first evaluator performed a number of times indicated by the first repeating number, the skill level table capable of storing by correlating the followings: (2-1) second personal name data indicating a second evaluator; (2-2) a second repeating number; (2-3) skill level data indicating a skill level of the second evaluator who performed the same test a number of times indicated by the second repeating number; and (2-4) a cumulative number indicating a number of tests performed a number of times indicated by the second repeating number, in tests performed by the second evaluator, (b) an additional storage processing part that additionally stores in the test information table, each time any one of the plurality of tests is performed, data relating to a second test to be performed, namely, the test specification identification data, the first personal name data, the first repeating number, and the individual performance factor; (c) an updating part that executes, each time any one of the plurality of tests is performed, and then an additional storage by the additional storage processing part is executed, the following processes: i) a process of extracting from the test information table a record corresponding to a third test to be performed, and a third evaluator who performed the third test, and then finding from an extracted record a first record having a maximum in the first repeating number; ii) a process of extracting from the test information table a record corresponding the third test and the third evaluator, and having "1" in the first repeating number, and then finding the individual performance factor contained in the record, as a first initial performance factor; iii) a process of extracting from the skill level table a second record having the second personal name data corresponding to the third evaluator, and having the second repeating number matching with the first repeating number contained in the first record; iv) a process of computing new skill level data, based on the individual performance factor of the first record, the skill level data and the cumulative number of the second record, and the first initial performance factor; and v) a process of updating the skill level table by using the new skill level data and a value obtained by adding "1" to the cumulative number; (d) an input part that accepts data input; and (e) a man-hour computing part that executes the following processes of: i) a process of extracting from the test information table a record corresponding to a fourth test designated by an input from the input part, and a fourth evaluator performing the fourth test, and then finding from an extracted record a third record having a maximum in the first repeating number; ii) a process of extracting from the test information table a record corresponding the fourth test and the fourth evaluator, and having "1" in the first repeating number, and then finding the individual performance factor contained in the record, as a second initial performance factor; iii) a process of extracting from the skill level table a fourth record having the second personal name data matching with the first personal data contained in the third record, and having the second repeating number matching with a value obtained by adding "1" to the first repeating number contained in the third record; and iv) a process of computing a test man-hour of the fourth test, based on the skill level data of the fourth record, and the second initial performance factor.

Based on the data stored in the test information table and the skill level table, the man-hour of the test performed repeatedly by the evaluator can be estimated easily and accurately.

According to other aspect of the present invention, a test man-hour estimating apparatus includes: (a) a storage part capable of storing a plurality of tables of a test information table and a skill level table, the test information table capable of storing by correlating the followings: (1-1) test specification identification data specifying a first test from a plurality of tests; (1-2) first personal name data indicating a first evaluator who performed the first test; (1-3) a first repeating number indicating a number of times the first evaluator performed the first test; (1-4) an individual performance factor indicating a performance efficiency of the first evaluator, with respect to the first test the first evaluator performed a number of times indicated by the first repeating number, and (1-5) a normalized performance factor obtained by dividing the individual performance factor by an initial performance factor indicating a performance efficiency of the first evaluator when the first test was performed a time, the skill level table capable of storing by correlating the followings: (2-1) second personal name data indicating a second evaluator; (2-2) a second repeating number; (2-3) skill level data indicating a skill level of the second evaluator who performed the same test a number of times indicated by the second repeating number; and (2-4) a cumulative number indicating a number of tests performed a number of times indicated by the second repeating number, in tests performed by the second evaluator, (b) an additional storage processing part that additionally stores in the test information table, each time any one of the plurality of tests is performed, data relating to a second test to be performed, namely, the test specification identification data, the first personal name data, the first repeating number, the individual performance factor, and the normalized performance factor; (c) an updating part that executes, each time any one of the plurality of tests is performed, and then an additional storage by the additional storage processing part is executed, the following processes of: i) a process of extracting from the test information table a record corresponding to a third test to be performed, and a third evaluator who performed the third test, and then finding from an extracted record a first record having a maximum in the first repeating number; ii) a process of extracting from the skill level table a second record having the second personal name data corresponding to the third evaluator, and having the second repeating number matching with the first repeating number contained in the first record; iii) a process of computing new skill level data, based on the normalized performance factor of the first record, and the skill level data and the cumulative number of the second record; and iv) a process of updating the skill level table by using the new skill level data and a value obtained by adding "1" to the cumulative number; (d) an input part that accepts data input; and (e) a man-hour computing part that executes, in order to estimate a test man-hour, the following processes of: i) a process of extracting from the test information table a record corresponding to a fourth test designated by an input from the input part, and a fourth evaluator performing the fourth test, and then finding from an extracted record a third record having a maximum in the first repeating number; ii) a process of extracting from the skill level table a fourth record having the second personal name data matching with the first personal data contained in the third record, and having the second repeating number matching with a value obtained by adding "1" to the first repeating number contained in the third record; and iii) a process of computing a test man-hour of the fourth test, based on the skill level data of the fourth record, and the initial performance factor relating to the fourth test and a fourth evaluator performing the fourth test.

Based on the data stored in the test information table and the skill level table, the man-hour of the test performed repeatedly by the evaluator can be estimated easily and accurately.

Accordingly, an object of the present invention is to provide the test man-hour estimating apparatus capable of estimating easily a test man-hour even when an evaluator repeatedly performs the same type of a test, as well as the recording medium recording a computer-readable program.

These and other objects, features, aspects and advantages of the present invention will become more apparent from the following detailed description of the present invention when taken in conjunction with the accompanying drawings.

DESCRIPTION OF THE PREFERRED EMBODIMENTS

Preferred embodiments of the present invention will be described below in detail with reference to the accompanying drawings.

<1. Hardware Configuration of Test Man-Hour Estimating Apparatus>

Figure 1:
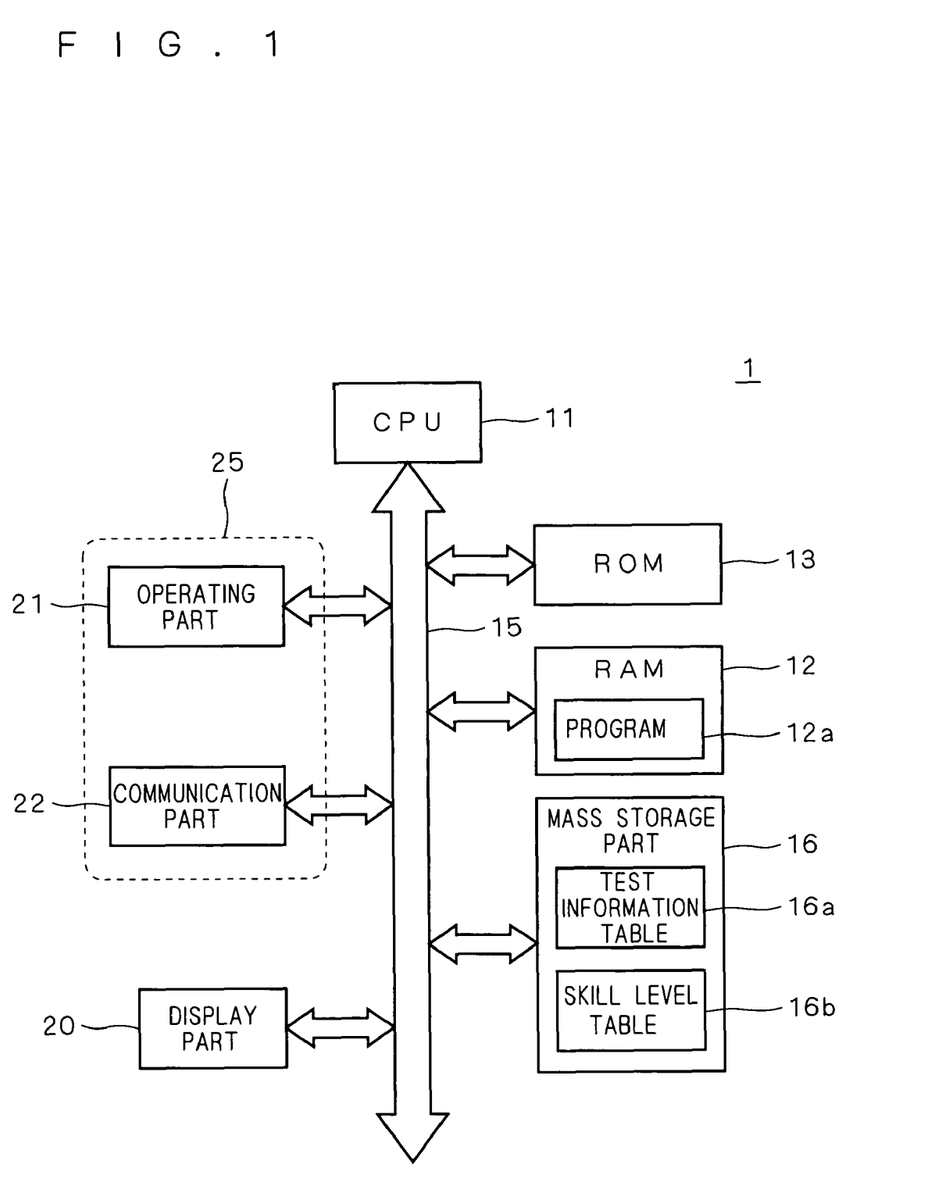
FIG. 1 is a diagram showing an example of the hardware configuration of a test man-hour estimating apparatus according to an embodiment of the present invention.

FIG. 1 is a diagram showing an example of the overall configuration of a test man-hour estimating apparatus 1 in an embodiment of the present invention. The test man-hour estimating apparatus 1 is an apparatus of estimating the test man-hour of the same type of a test (a certain test) that each evaluator repeatedly performs with software as the object to be tested. As shown in FIG. 1, the test man-hour estimating apparatus 1 is provided mainly with a CPU 11, a mass storage part 16, a display part 20, an operating part 21, and a communication part 22.

As used here, the term "software" means a program relating to the operation of a CPU (a controller) in various devices. For example, it means programs for realizing the function of storing a desired image in an image storing device, and a desired substrate processing function in a substrate processing device.

The term "test" means (i) a unit test to test whether each module operates in conformity with a specification; (ii) a join test to verify the interface between modules; and (iii) a functional test, a performance test, and an operational test in order to confirm whether software formed from a plurality of modules is operated in conformity with a specification.

The display part 20 is made up of a CRT (cathode ray tube) display, a liquid crystal display or the like. The operating part 21 is an input part made up of a so-called keyboard and a mouse. Therefore, a user of the test man-hour estimating apparatus 1 (hereinafter referred to simply as a "user") can direct the test man-hour estimating apparatus 1 to execute a predetermined operation by performing an input operation based on the content of a display of the display part 20.

The communication part 22 is a LAN interface that executes data communication between information processing units connected over a network such as LAN (local area network). Therefore, data transmitted from an external information processing unit via the communication part 22 can be inputted to the test man-hour estimating apparatus 1. That is, not only the operating part 21 but also the communication part 22 can be used as an input part 25 that accepts data input to the test man-hour estimating apparatus 1.

The mass storage part 16 is a storage part having a larger storage capacity than a RAM 12, such as a so-called hard disk drive or a silicon disk drive. As shown in FIG. 1, the mass storage part 16 is capable of storing a plurality of tables, namely, a test information table 16a and a skill level table 16b. The mass storage part 16 is also capable of sending data to and receiving data from the RAM 12 as needed. The data configurations of the test information table 16a and the skill level table 16b to be stored in the mass storage part 16 will be described later.

The RAM 12 is a volatile memory that can read and write. A ROM 13 is a read-only memory. The CPU 11 executes a control in accordance with a program 12a stored in the RAM 12. The CPU 11 is also electrically connected via a signal line 15 to the RAM 12, the mass storage part 16, the display part 20, the operating part 21, and the communication part 22, respectively.

Hence, in accordance with the program 12a, the CPU 11 can execute at a predetermined timing, for example, a screen display process by means of the display part 20, and a read/write process of data stored in the mass storage part 16.

<2. Data Configurations of Test Information Table and Skill Level Table>

Figure 2:
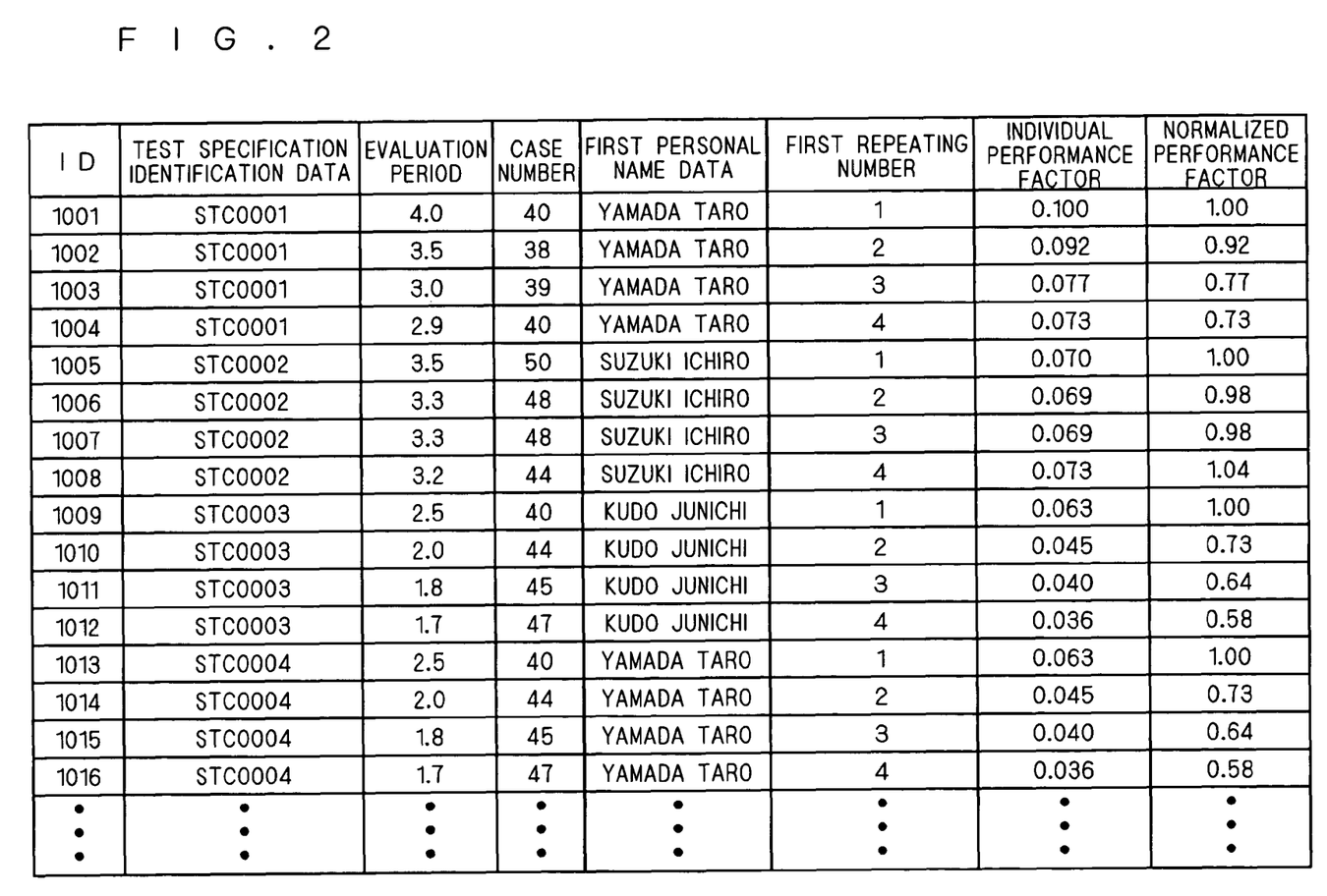
FIG. 2 is a diagram showing an example of the data configuration of a test information table.

FIG. 2 is a diagram showing an example of the data configuration of the test information table 16a stored in the mass storage part 16. As shown in FIG. 2, the test information table 16a has mainly the following fields (columns) of "ID," "test specification identification data," "evaluation period," "case number," "first personal name data," "first repeating number," "individual performance factor," and "normalized performance factor."

The "ID" field stores values for uniquely identifying individual records (columns) contained in the test information table 16a. The "test specification identification data" field stores data used for specifying a test (a first test) from a plurality of tests.

Here, the test includes ones used for the test of software packaged in various devices (e.g., an image recording device and a substrate processing device). For example, the records that the "test specification identification data" in FIG. 2 become "STC0001," "STC0002," "STC0003," and "STC0004" are data aggregate relating to the functional test, performance test, load test, and operational test in the software which are respectively packaged in the substrate processing device.

The "evaluation period" field stores the period of time (in day) when a test specified by the "test specification identification data" was carried out. The "case number" field stores the number of test cases (test items) contained per test.

The "first personal name data" stores, with respect to a test (a first test) specified by the "test specification identification data," data (e.g., character string data) indicating the evaluator who performed this test. For example, it will be seen in FIG. 2 that the evaluator of a record satisfying "ID"="1001" is "Yamada Taro."

The "first repeating number" stores the value indicating a number of times the evaluator (the first evaluator) performed the test specified by the "test specification identification data." For example, it can be seen that the test of the record satisfying "ID"="1007" (the "test specification identification data"="STC0002") was performed "3" times by "Suzuki Ichiro."

The "individual performance factor" stores, with respect to software that the same evaluator (the first evaluator) performed a number of times indicated by the "first repeating number," the value indicating the performance efficiency of this evaluator. The "individual performance factor" stores the evaluated man-hour per case. That is, the evaluated man-hour per case (the individual performance factor) Vc can be found from the following equation 1:

$$Vc = P/C1 \quad \text{(Equation 1)}$$

where P is a value stored in the "evaluation period," and C1 is a value stored in the "case number."

The "normalized performance factor" field stores the value obtained by dividing the "individual performance factor" by the initial performance factor. Here, the initial performance factor is the value indicating the performance efficiency of the first evaluator when each test was performed a time. That is, the initial performance factor is related to the same test and the same evaluator in the records in the test information table 16a, and it also means the value stored in the "individual performance factor" field in the record having "1" in the value of the "first repeating number" field. For example, the initialization factor of the test "STC0001" performed by "Yamada Taro" is "0.100".

Although in the present embodiment, the test information table 16a is provided with the normalized performance factor" field, the data configuration of the test information table 16a is not limited thereto. For example, whenever the value of the "normalized performance factor" becomes necessary, the necessary record may be extracted from the test information table 16a, and the "normalized performance factor" may be found based on the extracted record.

Figure 3:
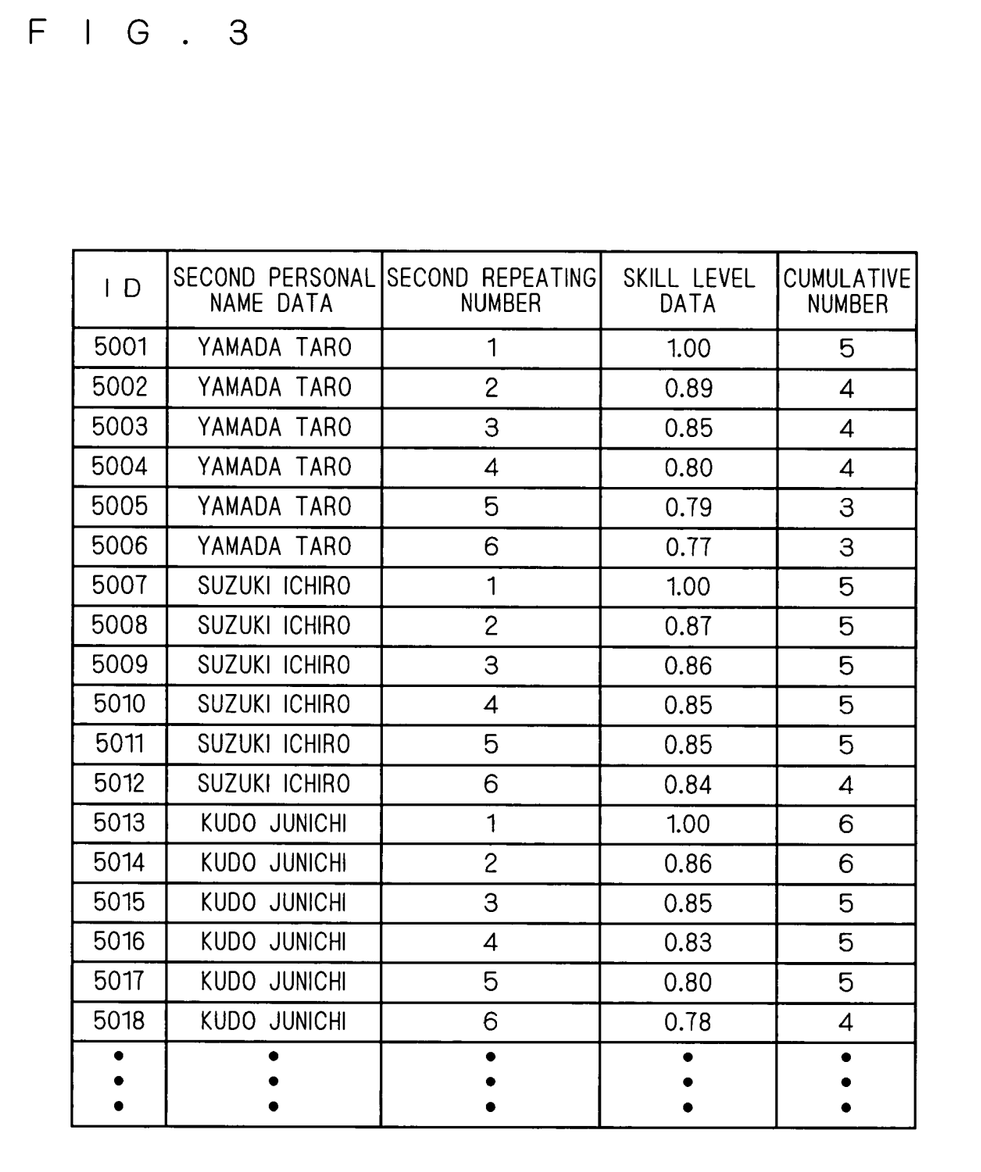
FIG. 3 is a diagram showing an example of the data configuration of a skill level table.

FIG. 3 is a diagram showing an example of the data configuration of the skill level table 16b stored in the mass storage part 16. As shown in FIG. 3, the test information table 16b has mainly the following fields of "ID," "second personal name data," "second repeating number," "skill level data," and "cumulative number."

The "ID" field stores values for uniquely identifying individual records contained in the skill level table 16b.

Like the "first personal name data," the "second personal name data" have data (e.g., character string data), which indicate an evaluator (a second evaluator). Accordingly, the "second personal name data" of the skill level table 16b is used as a retrieval key, and the skill level table 16b is retrieved, so that the record corresponding to the value of the "first personal name data" field can be extracted from the skill level table 16b.

For example, when the record corresponding to the "first personal name data"="Yamada Taro" in the test information table 16a is extracted from the skill level table 16b, ones having the "ID" of "5001" to "5006" are extracted from the skill level table 16b.

The "skill level data" field stores data indicating the skill level when the same evaluator (the second evaluator) performed the same test a number of times indicated by the "second repeating number" field. The "cumulative number" field stores the value indicating the number of tests performed a number of times indicated by the "second repeating number" field, in the tests performed by the same evaluator.

For example, the value of the "second personal name data" of the record of "ID"="5016" is "Kudo Junichi," and the value of the "second repeating number" is "4". The value of the "skill level data" is "0.83", and the value of "cumulative number" is "5". It can be seen from this record that "Kudo Junichi" has performed four times for each of the five types of tests, and the skill level when he performed repeatedly the same test four times is "0.83".

In the present embodiment, the process of computing the test man-hour of each test is executed based on the "skill level data." The details of the technique of computing the test man-hour and the technique of updating the skill level data will be described later.

<3. Functional Configuration of Test Man-Hour Estimating Apparatus>

Figure 4:
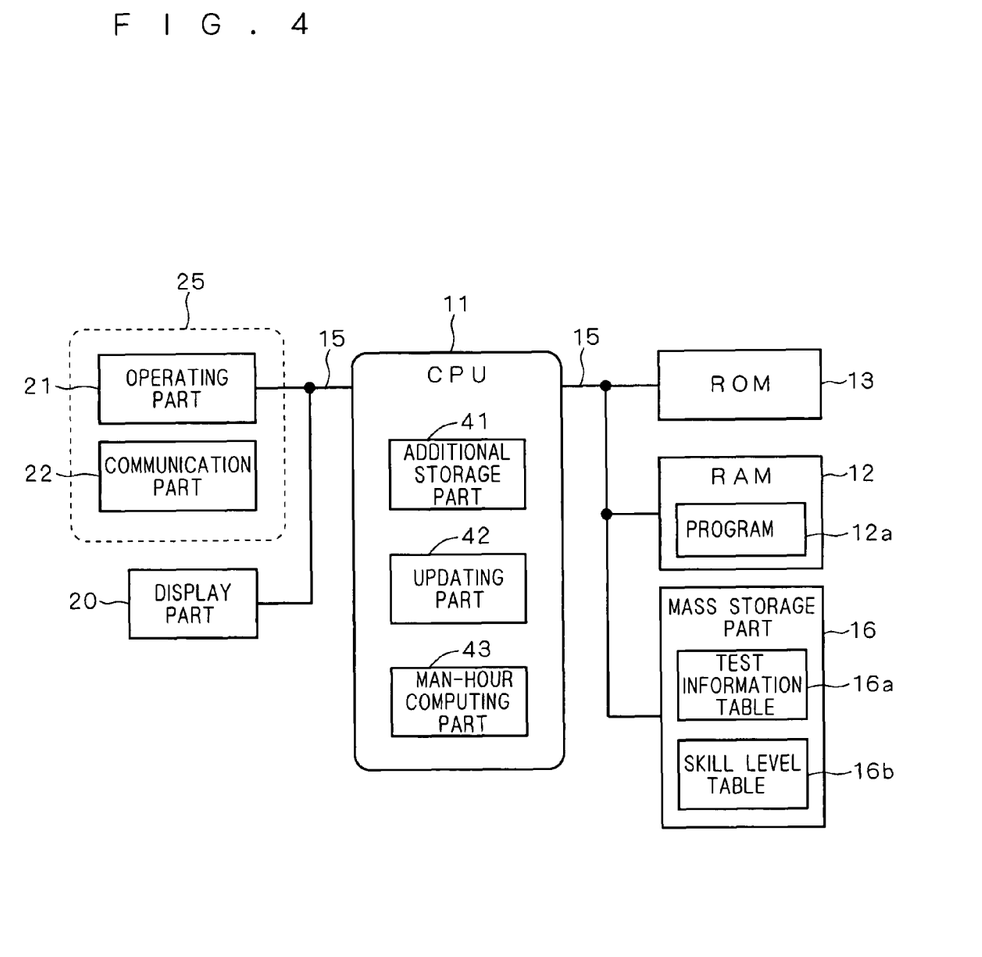
FIG. 4 is a block diagram showing an example of the functional configuration of the test man-hour estimating apparatus in the embodiment.

FIG. 4 is a block diagram showing an example of the functional configuration of the test man-hour estimating apparatus 1. As shown in FIG. 4, the CPU 11 of the test man-hour estimating apparatus 1 realizes mainly an additional storage function, an updating function, and a man-hour computing function, based on the program 12a stored in the RAM 12.

The additional storage processing part 41 additionally stores in the test information table 16a data relating to the test to be performed (the second test), each time any one of the plurality of tests is carried out.

That is, the additional storage processing part 41 adds a new record in the test information table 16a, each time any one of the plurality of tests is carried out. The data relating to the test to be performed can be stored in the "test specification identification data" field, the "first personal name data" field, the "first repeating number" field, and the "individual performance factor" field in the added record.

The additional storage processing part 41 also extracts from the test information table 16a a record corresponding to the test to be performed and the evaluator of this test, and having "1" in the "first repeating number," and finds the value of the "individual performance factor" in the extracted record, as an "initial performance factor." Subsequently, the additional storage processing part 41 divides the "individual performance factor" of the test performed by the obtained "initial performance factor." The additional storage processing part 41 stores the value obtained by this divide, in the "normalized performance factor."

The updating part 42 updates the corresponding record of the skill level table 16b, each time any one of the plurality of tests is performed, and then the additional storage by the additional storage processing part 41 is executed. That is, the updating part 42 extracts from the test information table 16a the records corresponding to the test to be performed (the third test), and the evaluator who performed this test (the third evaluator). The updating part 42 then compares the values of the "first repeating number" in the extracted records, and then finds from the extracted records a record (the first record) having a maximum in the value of the "first repeating number."

Subsequently, the updating part 42 finds the initial performance factor of the test to be performed. That is, the updating part 42 extracts from the test information table 16a a record corresponding to the test to be performed and the evaluator of this test, and having "1" in the value of the "first repeating number." The updating part 42 then finds the value of the "individual performance factor" contained in the extracted record, as an "initial performance factor (a first initial performance factor)."

The updating part 42 then retrieves the skill level table 16b by using as keys the "second personal name data" and the "second repeating number" fields in the skill level table 16b. The record (the second record) having the "second personal name data" corresponding to the evaluator of the test to be performed (the third evaluator), and the "second repeating number" matching with the maximum value of the "first repeating number" can be extracted from the skill level table 16b.

New skill level data $Mv(n+1)$ can be computed from the following equation 2:

$$Mv(n+1)=(Vc/V0+n\cdot Mv(n))/(n+1) \quad \text{(Equation 2)}$$

where Vc is a value of the "individual performance factor" of the first record extracted from the rest information table 16a; $Mv(n)$ is a value of skill level data of the second record extracted from the skill level table 16b; n is a value of a "cumulative number" of the second record; and V0 is a value of an initial performance factor (a first initial performance factor) found from the test information table 16a.

The updating part 42 then updates the second record in the skill level table 16b by using the new skill level data computed by the equation 2 (the skill level data for updating), and a value obtained by adding "1" to the "cumulative number" of the second record.

Thus, in the present embodiment, the skill level data can be updated each time each evaluator performs a test. Hence, as the number of executions of the test is increased, the reliability of the "skill level data" in the skill level table 16b can be improved. This enables the man-hour estimating part 43 to estimate more accurately the test man-hour of the test performed based on the "skill level data."

Figure 5:
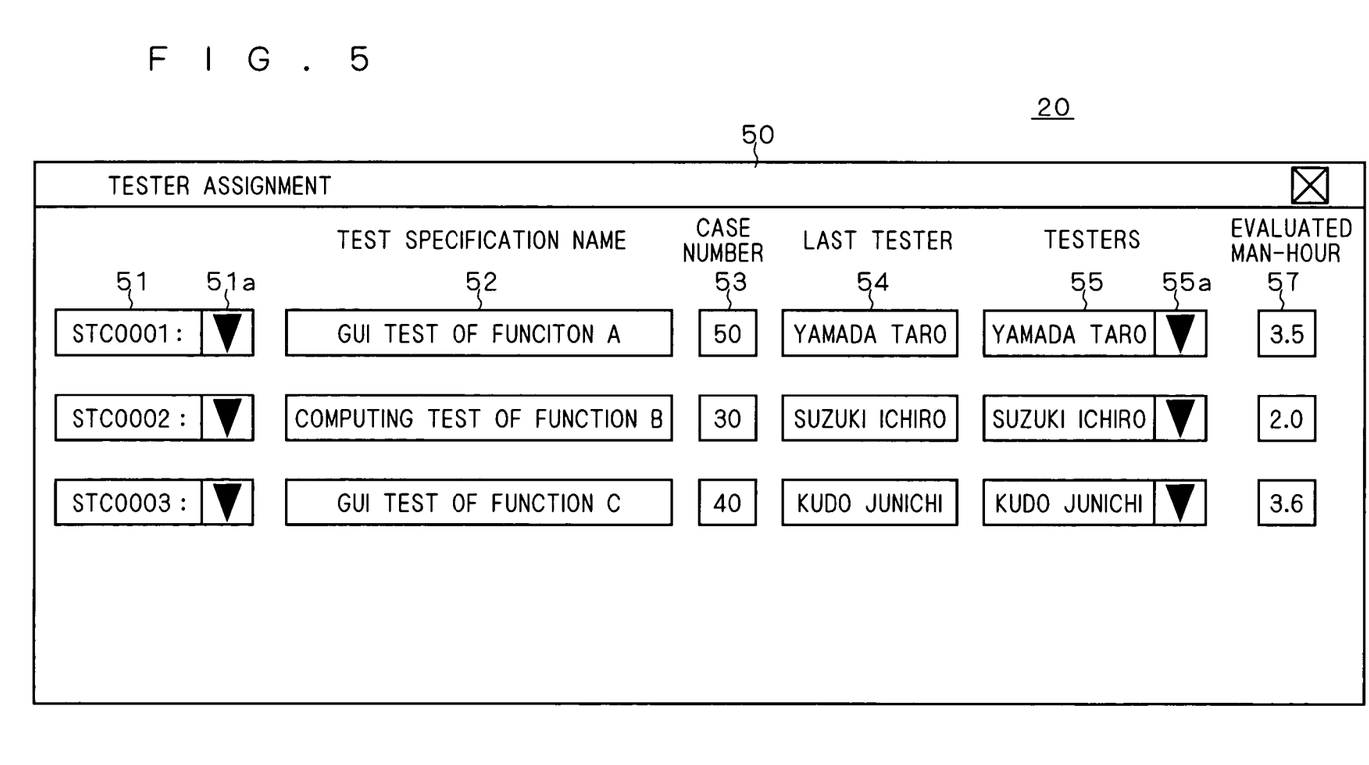
FIG. 5 is a diagram showing an example of a dialog to be displayed on a display part.

The man-hour computing part 43 executes the process of estimating the test man-hour relating to the evaluator and the test designated in accordance with the contents of the display of the display part 20. FIG. 5 is a diagram showing an example of a dialog 50 to be displayed on the display part 20. As shown in FIG. 5, the dialog 50 has mainly a plurality of text boxes 52 to 54, and 57, and a plurality of combo boxes 51 and 55.

The combo box 51 is used to designate a test (a fourth test) from the plurality of tests. A test specification name corresponding to the test designated by the combo box 51 is displayed on the text box 52.

Specifically, when a button 51a on the left side of the combo box 51 is pushed by the instruction of the operating part 21, a selectable list of "test specification identification data" (not shown) is displayed on a lower part of the comb box 51. Therefore, the user can designate a test by designating the desired "test specification type data" from the list. When the value of the combo box 51 is changed by the designation, the corresponding display of the text box 52 can be changed in response to the change.

The case numbers of the respective tests are inputted to the text box 53. The man-hour computing part 43 computes a test man-hour based on the case number inputted to the text box 53.

The name of an evaluator (last tester), who performed last time the test designated by the combo box 51, is displayed on the text box 54. For example, the user can determine an evaluator who performs this time, based on the tester name displayed on the text box 54.

The combo box 55 is used to designate a tester from a plurality of testers. Specifically, when a button 55a on the left side of the combo box 55 is pushed by the instruction of the operating part 21, a selectable list of "testers" (not shown) is displayed on a lower part of the combo box 55. Therefore, the user can designate a tester (a fourth evaluator) by designating the desired "tester" from the list.

The man-hour computing part 43 extracts from the test information table 16a a record that corresponds to a test (a fourth test) designated by the input from the operating part 21, and an evaluator (a fourth evaluator) who performs a test to be performed. The man-hour computing part 43 then finds from the extracted record a record (a third record) having a maximum in the value of the "first repeating number" field.

Subsequently, the man-hour computing part 43 extracts from the test information table 16a a record corresponding to the test and the evaluator designated through the operating part 21, and having "1" in the value of the "first repeating number." The man-hour computing part 43 then finds the value of the "individual performance factor" contained in the extracted record, as an initial performance factor (a second initial performance factor). That is, the initial performance factor can be found as data relating to the fourth test, and the fourth evaluator who performs the fourth test.

Subsequently, the man-hour computing part 43 retrieves the skill level table 16b by using as keys the "second name data" and the "second repeating number" fields in the skill level table 16b. As a result, a record (a fourth record), which matches with the value of the "first personal name data" contained in the third record extracted from the test information table 16a, and which matches with a value obtained by adding "1" to the value of the "first repeating number" contained in the third record, can be extracted from the skill level table 16b.

Test man-hour Pf can be computed from the following equation 3:

$$Pf = V0 \cdot Mv(n) \cdot C2 \qquad \text{(Equation 3)}$$

where Mv (n) is "skill level data" of the fourth record extracted from the skill level table 16b; V0 is a value of the initial performance factor (the second initial performance factor) found from the test information table 16a; and C2 is a value of the case number of the fourth test.

Then, the man-hour computing part 43 directs the text box 57 of the display part 20 to display the test man-hour (the evaluated man-hour) computed from the equation 3. Thus, the user can easily confirm the test man-hour of each test, by means of an operation (an input) through the dialog 50. This facilitates to find the test man-hours required for all the tests, and hence it is easy to estimate the man-hour of the whole of the tests.

<4. Advantages of Test Man-Hour Estimating Apparatus of the Embodiment>

Thus, the test man-hour estimating apparatus 1 of the present embodiment is capable of additionally storing in the test information table 16a, each time each test is performed, the first personal name data indicating the evaluator of the test, the first repeating number, and the individual performance factor.

It is also capable of storing in the skill level table 16b, each time each test is performed and thereafter data are additionally stored in the test information table 16a, the second personal name data of each evaluator, the second repeating number, and the skill level data.

Hence, the test man-hour estimating apparatus 1 is capable of estimating easily and accurately the man-hour of the test performed repeatedly by the evaluator, based on the data stored in the test information table 16a and the skill level table 16b.

<5. Modifications>

While the embodiment of the present invention has been described, the present invention is not limited thereto, and various modifications can be made.

(I) Although in the foregoing embodiment, the updating part 42 finds new skill level data (skill level data for updating) from the equation 2, the technique of computing the new skill level data is not limited thereto.

For example, the updating part 42 extracts from the test information table 16a records corresponding to a test to be performed (a third test), and an evaluator (a third evaluator) performing this test. The updating part 42 then compares the values of the "first repeating number" in the extracted records, and finds from the extracted records a record (a first record) having a maximum in the value of the "first repeating number."

Subsequently, the updating part 42 retrieves the skill level table 16b by using as keys the "second personal name data" and the "second repeating number" fields in the skill level table 16b. The updating part 42 then extracts from the skill level table 16b a record (a second record) having the "second personal name data" corresponding to the evaluator of the test to be performed (the third evaluator), and the "second repeating number" matching with a maximum value in the "first repeating number."

New skill level data Mv(n+1) may be computed from the following equation 4:

$$Mv(n+1) = (Vn + n \cdot Mv(n))/(n+1) \qquad \text{(Equation 4)}$$

where Vn is a value of the "normalized performance factor" of the first record extracted from the test information table 16a; Mv(n) is a value of the skill level data of the second record extracted from the skill level table 16b; and n is a value of the "cumulative number" of the second record.

Also in this case, as the number of executions of the test is increased, the reliability of the "skill level data" in the skill level table 16b is improved. This enables the man-hour estimating part 43 to estimate more accurately the man-hour of a test performed based on the "skill level data."

(II) Although in the foregoing embodiment, the test man-hour Pf is computed from the equation 3, the technique of computing the test man-hour is not limited thereto. For example, the test man-hour may be estimated based on the skill level data of an evaluator (a fourth evaluator), and the average skill level data of a plurality of evaluators including the evaluator (the fourth evaluator).

The average skill level data Mave(n) can be found from the following equation 5:

$$Mave(n) = \Sigma(C(x) \cdot Mv(n,x))/(\Sigma C(x)) \qquad \text{(Equation 5)}$$

where Mv(n, x) is "skill level data" of each evaluator, and $C(x)$ ($1 \leq X \leq q$) is a "cumulative number" of each evaluator, when q is the number of evaluators, and the "second repeating number" is "m" (m is a natural number).

Test man-hour Pf when the "second repeating number" of the fourth record is "m" can be computed from the following equation 6:

$$Pf = V0 \cdot C2(k \cdot Mv(n) + (1-k) \cdot Mave(n)) \qquad \text{(Equation 6)}$$

where k ($0 \leq k \leq 1$) is a weighting factor, Mv(n) is "skill level data" of the fourth record extracted from the skill level table 16b, V0 is a value of an initial performance factor (a second initial performance factor) found from the test information table 16a, and C2 is a value of the case number of the fourth test.

Thus, the man-hour computing part 43 is also capable of finding a test man-hour by setting weighting to the skill level of the fourth evaluator and the average skill level of a plurality of evaluators including the fourth evaluator, respectively. It is therefore possible to find the test man-hour Pf without being affected by variations in the skill level data of the evaluators, making it possible to find the test man-hour more accurately. The value of a weighting factor k is found in advance by experiment or the like.

(III) Although in the foregoing embodiment, the test information table 16a and the skill level table 16b have been described so as to be stored in the mass storage part 16, these are not limited thereto. When the RAM 12 has a sufficient storage capacity, these tables 16a and 16b may be stored in the RAM 12.

Figure 6:
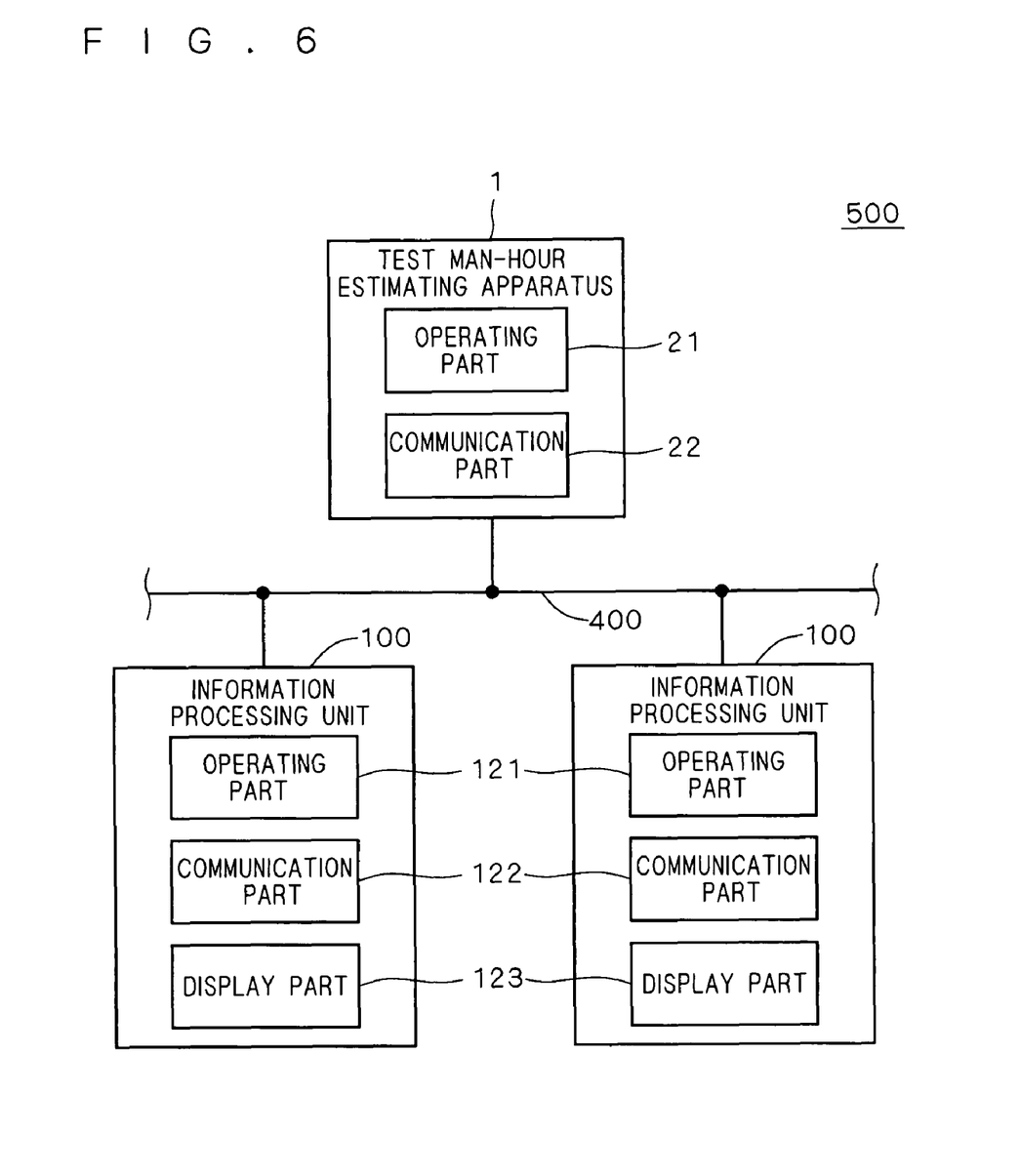
FIG. 6 is a diagram showing an example of the configuration of a test man-hour estimating system.

(IV) The specific example of the invention of the present embodiment is not limited to the test man-hour estimating apparatus 1 shown in FIG. 1. FIG. 6 is a diagram showing an example of the configuration of a test man-hour estimating system 500. The functions of the test man-hour estimating apparatus 1 of the present embodiment can also be realized by the test man-hour estimating system 500.

Here, an information processing unit 100 is configured by a so-called personal computer or work station, and is provided mainly with a display part 120, an operating part 121, and a communication part 122. The display part 120, the operating part 121, and the communication part 122 correspond to the display part 20, the operating part 21, and the communication part 22 of the test man-hour estimating apparatus 1, respectively. The information processing unit 100 and the test man-hour estimating system 500 are electrically connected to each other over a network 400, enabling data sending/receiving between the two apparatuses 1 and 100.

Therefore, the dialog 50 (refer to FIG. 5) can be displayed on the display part 120, and the user of the information processing unit 100 can designate the desired test (the fourth test) and "tester" (the fourth evaluator) by operating the operating part 121 in accordance with the contents of the display. That is, the test man-hour estimating apparatus 1 can compute the test man-hour based on the data relating to the test and the evaluator transmitted from the information processing unit 100 and inputted to the communication part 22 of the test man-hour estimating apparatus 1.

Hence, like the test man-hour estimating apparatus 1, the test man-hour estimating system 500 is capable of estimating easily and accurately the man-hour of the test performed repeatedly by the evaluator, based on the data stored in the test information table 16*a* and the skill level table 16*b*.

(V) Although the foregoing embodiment has described the test man-hour estimating apparatus 1, the test man-hour estimating system 500, and the program thereof with software as the object to be tested, the object to be tested is not limited thereto. For example, the object to be tested may be tests relating to the mechanical design of an apparatus and the circuit design of an apparatus.

While the invention has been shown and described in detail, the foregoing description is in all aspects illustrative and not restrictive. It is therefore understood that numerous modifications and variations can be devised without departing from the scope of the invention.

What is claimed is:

1. A test man-hour estimating apparatus of estimating a man-hour of the same type of a test that an evaluator performs repeatedly to an object to be tested, comprising:
    (a) a storage part for storing a plurality of tables of:
        a test information table; and
        a skill level table,
        the test information table capable of storing by correlating the following:
            (1-1) test specification identification data specifying a first test from a plurality of tests;
            (1-2) first personal name data indicating a first evaluator who performed the first test;
            (1-3) a first repeating number indicating a number of times the first test was performed by the first evaluator; and
            (1-4) an individual performance factor indicating a performance efficiency of the first evaluator, with respect to the first test the first evaluator performed a number of times indicated by the first repeating number, the skill level table for storing by correlating the followings:
            (2-1) second personal name data indicating a second evaluator;
            (2-2) a second repeating number indicating a number of times the same first test was performed by a second evaluator;
            (2-3) skill level data indicating a skill level of the second evaluator who performed the same first test a number of times indicated by the second repeating number; and
            (2-4) a cumulative number indicating a number of tests performed a number of times indicated by the second repeating number, in tests performed by the second evaluator,
    (b) an additional storage processing part that additionally stores in the test information table, each time any one of the plurality of tests is performed, data relating to a second test to be performed, including the test specification identification data, the first personal name data, the first repeating number, and the individual performance factor;
    (c) each time any one of the plurality of tests is performed and additional storage by the additional storage processing part is executed, an updating part, implemented on a processor, configured to perform the following processes:
        i) a process of extracting from the test information table a record corresponding to a third test to be performed, and a third evaluator who performed the third test, and then finding from an extracted record, a first record having a maximum in the first repeating number;
        ii) a process of extracting from the test information table a record corresponding the third test and the third evaluator, and having "1" in the first repeating number, and then retrieving the individual performance factor contained in the record, as a first initial performance factor;
        iii) a process of extracting from the skill level table a second record having the second personal name data corresponding to the third evaluator, and having the second repeating number matching with the first repeating number contained in the first record;
        iv) a process of computing new skill level data, based on the individual performance factor of the first record, the skill level data and the cumulative number of the second record, and the first initial performance factor; and
        v) a process of updating the skill level table by using the new skill level data and a value obtained by adding "1" to the cumulative number;
    (d) an input part that accepts data input; and
    (e) a man-hour computing part, implemented on the processor configured to perform the following processes:
        i) a process of extracting from the test information table a record corresponding to a fourth test designated by the data input from the input part, and a fourth evaluator performing the fourth test, and then finding from the extracted record a third record having a maximum in the first repeating number;
        ii) a process of extracting from the test information table the extracted record corresponding the fourth test and the fourth evaluator, and having "1" in the first repeating number, and then finding the individual performance factor contained in the record, as a second initial performance factor;
        iii) a process of extracting from the skill level table a fourth record having the second personal name data matching with the first personal data contained in the third record, and having the second repeating number matching with a value obtained by adding "1" to the first repeating number contained in the third record; and
        iv) a process of computing a test man-hour of the fourth test, based on the skill level data of the fourth record, and the second initial performance factor.

2. The test man-hour estimating apparatus according to claim 1, wherein
    the man-hour computing part estimates a test man-hour of the fourth test, based on the skill level of the fourth evaluator, and an average skill level of a plurality of evaluators including the fourth evaluator.

3. The test man-hour estimating apparatus according to claim 2, wherein the man-hour computing part estimates the test man-hour of the fourth test by setting weighting to the skill level of the fourth evaluator, and an average skill level of the plurality of evaluators including the fourth evaluator, respectively.

4. The test man-hour estimating apparatus according to claim 1, wherein the man-hour computing part directs a display part to display a computed test man-hour.

5. A product comprising a non-transitory machine readable medium and executable program embodied in the medium, wherein when executed by a programmable computer, the program causes a computer to estimate a man-hour of the same type of a test that an evaluator performs repeatedly to an object to be tested, the computer including:
   a storage part for storing a plurality of tables of:
   a test information table; and
   a skill level table,
   the test information table capable of storing by correlating the following:
     (1-1) test specification identification data specifying a first test from a plurality of tests;
     (1-2) first personal name data indicating a first evaluator who performed the first test;
     (1-3) a first repeating number indicating a number of times the first evaluator performed the first test; and
     (1-4) an individual performance factor indicating a performance efficiency of the first evaluator with respect to the first test the first evaluator performed a number of times indicated by the first repeating number,
   the skill level table capable of storing by correlating the following:
     (2-1) second personal name data indicating a second evaluator;
     (2-2) a second repeating number indicating a number of times a second evaluator performed the same first test;
     (2-3) skill level data indicating a skill level of the second evaluator who performed the same first test a number of times indicated by the second repeating number; and
     (2-4) a cumulative number indicating a number of tests performed a number of times indicated by the second repeating number, in tests performed by the second evaluator,
   wherein when executed by the computer, the program causes the computer to perform the following functions of:
     (a) a function of additionally storing in the test information table, each time any one of the plurality of tests is performed, data relating to a second test to be performed, including the test specification identification data, the first personal name data, the first repeating number, and the individual performance factor;
     (b) each time any one of the plurality of tests is performed and additional storing is executed, the following functions are performed:
       i) extracting from the test information table a record corresponding to a third test to be performed, and a third evaluator who performed the third test, and then retrieving from the extracted record a first record having a maximum in the first repeating number;
       ii) extracting from the test information table a record corresponding to the third test and the third evaluator, and having "1" in the first repeating number, and then retrieving the individual performance factor contained in the record, as a first initial performance factor;
       iii) extracting from the skill level table a second record having the second personal name data corresponding to the third evaluator, and having the second repeating number matching with the first repeating number contained in the first record;
       iv) computing new skill level data, based on the individual performance factor of the first record, the skill level data and the cumulative number of the second record, and the first initial performance factor; and
       v) updating the skill level table by using the new skill level data and a value obtained by adding "1" to the cumulative number; and
     (c) a function of estimating a test man-hour by:
       i) extracting from the test information table a record corresponding to a fourth test designated by the data input from the input part, and a fourth evaluator performing the fourth test, and then finding from the extracted record a third record having a maximum in the first repeating number;
       ii) extracting from the test information table the extracted record corresponding the fourth test and the fourth evaluator, and having "1" in the first repeating number, and then finding the individual performance factor contained in the record, as a second initial performance factor;
       iii) extracting from the skill level table a fourth record having the second personal name data matching with the first personal data contained in the third record, and having the second repeating number matching with a value obtained by adding "1" to the first repeating number contained in the third record; and
       iv) computing a test man-hour of the fourth test, based on the skill level data of the fourth record, and the second initial performance factor.

* * * * *